United States Patent [19]

Hara

[11] 4,387,965
[45] Jun. 14, 1983

[54] GUEST HOST TYPE, POSITIVE AND NEGATIVE RECESSED LIQUID CRYSTAL DISPLAY DEVICES

[75] Inventor: Yoshiyuki Hara, Kishiwada, Japan

[73] Assignee: Sharp Kabushiki Kaisha, Osaka, Japan

[21] Appl. No.: 222,920

[22] Filed: Jan. 6, 1981

[51] Int. Cl.³ .................................................. G02F 1/13
[52] U.S. Cl. ..................................... 350/349; 350/334; 350/339 R
[58] Field of Search ............... 350/349, 339 R, 334

[56] References Cited

U.S. PATENT DOCUMENTS

| | | | |
|---|---|---|---|
| 3,663,086 | 5/1972 | Assouline et al. | 350/349 X |
| 3,833,287 | 9/1974 | Taylor et al. | 350/349 |
| 3,837,730 | 9/1974 | Hatfield et al. | 350/349 |
| 4,235,525 | 11/1980 | Berman et al. | 350/349 X |

*Primary Examiner*—John K. Corbin
*Assistant Examiner*—David Lewis
*Attorney, Agent, or Firm*—Birch, Stewart, Kolasch & Birch

[57] ABSTRACT

A guest host type liquid crystal display device wherein a first distance between electrodes formed on a pair of substrates is defined to be different from a second distance between one of the electrodes formed on one of the substrates and the remaining portion of the other substrate which does not contain an electrode. In a positive type display device, the first distance is larger than the second distance. In a negative type display device, on the other hand, the first distance is smaller than the second distance.

6 Claims, 2 Drawing Figures

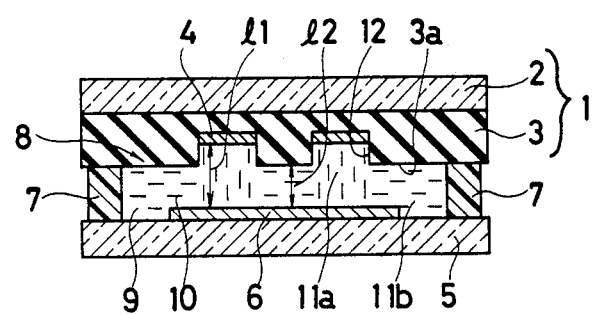
F I G. 1
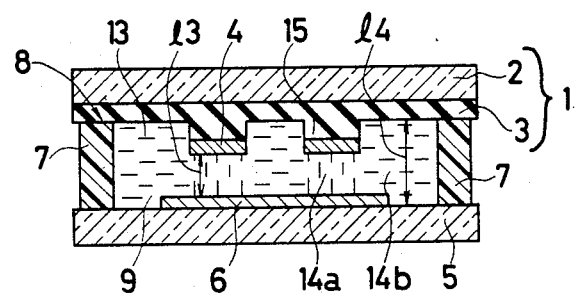
F I G. 2

GUEST HOST TYPE, POSITIVE AND NEGATIVE RECESSED LIQUID CRYSTAL DISPLAY DEVICES

BACKGROUND OF THE INVENTION

The present invention relates to a liquid crystal display device and, more particularly, to a guest host type liquid crystal display device with a high display contrast.

Guest host type liquid crystal display devices are characterized by that they include a thin layer of a host liquid crystal material in which a pleochroic guest material is dissolved. It is known that the alignment of the host liquid crystal material by the application of an electric field, such as nematic liquid crystal, can be used to orient guest molecules dissolved in the host. Such is disclosed in Taylor et al., U.S. Pat. No. 3,833,287, Sept. 3, 1974 "GUEST-HOST LIQUID CRYSTAL DEVICE".

Conventionally, the host liquid crystal layer is held by a pair of substrates positioned in parallel and with a certain separation distance. The display device is called a positive type in the cast where the electrode means shapes the direct or positive form of a display symbol to be indicated.

When an electric field is applied to the electrode means, the longitudinal axis of the guest molecule adjacent the electrode means is directed in the direction of the electric field. Color by this guest molecule becomes deep. Simultaneously, there is a tendency for color provided by the absorption spectrum in the direction of the minor axis of the guest molecule far from the electrode means to become deep to a certain degree. Therefore, only poor display contrast is provided.

In the case where the display device is a negative type in which the electrode means shapes the negative form of the display symbol, a similar problem is present.

Therefore, it is desired that the display contrast of such a display device be improved to provide a good practical device.

SUMMARY OF THE INVENTION

Accordingly, it is an object of the present invention to provide an improved guest hose type liquid crystal display device in which the above problems are eliminated.

It is another object of the present invention to provide an improved guest host type liquid crystal display device showing a good display contrast.

It is a further object of the present invention to provide an improved guest host type liquid crystal display having a first distance between two electrodes, and a second distance between one of the two electrodes and a substrate not supporting any electrode, the first distance being different from the second distance.

Other objects and further scope of applicability of the present invention will become apparent from the detailed description given hereinafter. It should be understood, however, that the detailed description and specific examples, while indicating preferred embodiments of the invention, are given by way of illustrations within the spirit and scope of the invention will become apparent to those skilled in the art from this detailed description.

To achieve the above objects, pursuant to an embodiment of the present invention, a guest host type liquid crystal display device is featured in that a first distance between electrodes formed on both of a pair of substrates is defined to be different from a second distance between one of the electrodes formed on one of the pair of substrates and the remaining portion of the other of the pair of substrates, not supporting an electrode. In a positive type display device, the first distance is larger than the second distance. In a negative type display device, on the other hand, the first distance is smaller than the second distance.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1 and 2 are cross-sectional views of guest host type liquid crystal display devices according to the present invention.

DESCRIPTION OF THE INVENTION

With reference to FIG. 1, a guest host type liquid crystal display device of the present invention, called a positive type, comprises a pair of substrates 1 and 5, patterned electrodes 4, a common electrode 6, a liquid crystal mixture 9, a pleochroic dye material 10, and sealing members 7.

The substrate 1 comprises a plate 2 preferably made of glass and an insulating layer 3 preferably made of $SiO_2$, $Si_3N_4$, $TiO_2$, polyimido, or the like. Each of the electrode means 4 and 6 is composed of a transparent, conductive film made of $SnO_2$ or the like. A cavity 8 is formed by the substrates 1 and 5, and the sealing members 7. The liquid crystal mixture 9 and the pleochroic dye material 10 held in suspension are disposed in the cavity 8. The pleochroic dye material 10 has the maximum absorption spectrum in the direction of the longitudinal axis of the dye molecule.

When the electric field is applied between the electrode means 4 and 6, the longitudinal axis of the pleochroic dye material 10 is arranged as shown in FIG. 1. The longitudinal axis of the pleochroic dye material 10 at a position 11a between the electrode means 4 and 6 becomes substantially in the direction of the electric field. On the other hand, the longitudinal axis of the dye material 10 at a position 11b far from the electrode means 4 and 6 is substantially perpendicular to the direction of the electric field.

As a feature of the present invention, a recess 12 is formed on the insulating layer 3. Within the recess 12, the electrode means 4 is disposed at a certain depth from the surface 3a of the insulating layer 3. The recess 12 is formed by an etching process, preferably. Therefore, a distance $l_1$ between the electrode means 4 and 6 is more than another distance $l_2$ between the surface 3a and the electrode means 6.

As a result, the dye material 10 is prevented from coloring at the position 11b since the coloration by the absorption spectrum in the direction of the minor axis of the dye molecule 10 at this position 11b is prohibited. Therefore, the coloration at this position 11b becomes pale and faint. At the portion 11a, on the other hand, the coloration by the maximum absorption spectrum in the direction of the longitudinal axis of the dye molecule 10 becomes deep. Thus, a display contrast is improved.

Preferably, $l_1$ is within about 10 to about 20 $\mu$m both, inclusive, and $l_2$ is within about 5 to about 15 $\mu$m, both inclusive.

With reference to FIG. 2, another example of the display device of the present invention, called a negative type, comprises the identical elements of FIG. 1 except that a distance $l_3$ between the electrode means 4 and 6 is smaller than another distance $l_4$ between the surface of the insulating layer 3 and the electrode means 6. The pleochroic dye material 10 of FIG. 1 is replaced by another type of pleochroic dye material 13 having the maximum absorption spectrum in the direction of the minor axis of the dye molecule.

As another feature of the present invention, a ridge portion 15 is formed extending from the insulating layer 3 through the use of rubbing techniques. The electrode means 4 is disposed on the ridge portion 15. As a result, at a position 14a between the electrode means 4 and 6, the pleochroic dye material 13 is prevented from coloring even when the electric field is applied between the electrode means 4 and 6, since the coloration by the absorption spectrum in the direction of the longitudinal axis of the dye material 13 at this portion 14a is prohibited. Therefore, the coloration at this position 14a becomes pale and faint. At a portion 14b, on the other hand, the coloration by the maximum absorption spectrum in the direction of the minor axis of the dye material 13 becomes deep. Thus the display contrast is improved.

Preferably, $l_3$ is within about 5 to about 15 μm, both inclusive, and $l_4$ is within about 10 to about 20 μm, both inclusive. The amount of $l_4$ can be assumed to be identical to the distance between the electrode means 6 and the center bottom portion of the insulating layer 3 in the case where the thickness of the electrode means 6 is negligable.

Each recess 12 and the ridge portion 15 can be formed directly on the substrate plate 2 rather than on the insulating layer 3, and each can be made through the use of an etching technique. The insulating layer 3 may be disposed over the substrate plate 2 and each recess 12 and ridge portion 15. The electrode means 4 is disposed on the insulating layer 3.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid crystal display device comprising:
   first and second substrates having opposed inward facing surfaces;
   first electrode means formed on the inward facing surface of said first substrate;
   a plurality of second electrode means formed on the inward facing surface of said second substrate, thereby forming electrode-less areas on said second substrate;
   said substrates being spaced apart with a first distance between said first and second electrode means being greater than a second distance between said electrode-less areas on said second substrate and said first electrode means;
   a pleochroic guest dye material contained between said substrates, said dye material having a maximum absorption spectrum in the direction of its longitudinal axis; and
   means for activating selected ones of said second electrode means whereby the area defined by said activated second electrode means forms a desired display.

2. A liquid crystal display device as in claim 1, wherein said first distance is about 10 to 20 μm and said second distance is about 5 to 15 μm.

3. A liquid crystal display device as in claim 1, wherein said second substrate comprises a glass plate and an insulating layer disposed thereon, said second electrode means being disposed on said insulating layer.

4. A liquid crystal display device comprising:
   first and second substrates having opposed inward facing surfaces;
   first electrode means formed on the inward facing surface of said first substrate;
   a plurality of second electrode means formed on the inward facing surface of said second substrate, thereby forming electrode-less areas on said second substrate;
   said substrates being spaced apart with a first distance between said first and second electrode means being less than a second distance between said electrode-less areas on said second substrate and said first electrode means;
   a pleochroic guest dye material contained between said substrates, said dye material having a maximum absorption spectrum in the direction of its minor axis; and
   means for activating selected ones of said second electrode means whereby the area defined by said activated second electrode means forms a desired display.

5. A liquid crystal display device as in claim 4, wherein said first distance is about 5 to 15 μm and said second distance is about 10 to 20 μm.

6. A liquid crystal display device as in claim 4, wherein said second substrate comprises a glass plate and an insulating layer disposed thereon, said second electrode means being disposed on said insulating layer.

* * * * *